(12) United States Patent
Nakamura et al.

(10) Patent No.: US 7,885,329 B2
(45) Date of Patent: Feb. 8, 2011

(54) MOTION VECTOR DETECTING APPARATUS AND METHOD FOR DETECTING MOTION VECTOR

(75) Inventors: Kenji Nakamura, Sakai (JP); Kazuyuki Inokuma, Yawata (JP)

(73) Assignee: Panasonic Corporation, Osaka (JP)

( * ) Notice: Subject to any disclaimer, the term of this patent is extended or adjusted under 35 U.S.C. 154(b) by 1577 days.

(21) Appl. No.: 11/165,265

(22) Filed: Jun. 24, 2005

(65) Prior Publication Data

US 2005/0286637 A1 Dec. 29, 2005

(30) Foreign Application Priority Data

Jun. 25, 2004 (JP) ............................ P2004-187953

(51) Int. Cl.
H04N 7/12 (2006.01)
G06K 9/36 (2006.01)

(52) U.S. Cl. .................................. 375/240.16; 382/236

(58) Field of Classification Search ............ 375/240.16, 375/240.24, 240.12, 240.17, 240.13; 382/236, 382/216, 227, 209, 254, 232, 234; 348/452, 348/448, 414, 459, 558
See application file for complete search history.

(56) References Cited

U.S. PATENT DOCUMENTS

| | | | | |
|---|---|---|---|---|
| 4,691,230 | A * | 9/1987 | Kaneko et al. ............... | 348/699 |
| 6,031,582 | A | 2/2000 | Nishikawa et al. | |
| 6,549,576 | B1 | 4/2003 | Moriyoshi | |
| 6,885,705 | B2 | 4/2005 | Arita et al. | |
| 2001/0014124 | A1 * | 8/2001 | Nishikawa ............... | 375/240.16 |
| 2002/0171759 | A1 * | 11/2002 | Handjojo et al. ............ | 348/452 |
| 2003/0123748 | A1 * | 7/2003 | Sebot et al. ................. | 382/254 |
| 2003/0189980 | A1 * | 10/2003 | Dvir et al. ............... | 375/240.16 |
| 2004/0247029 | A1 * | 12/2004 | Zhong et al. ........... | 375/240.16 |
| 2004/0264572 | A1 * | 12/2004 | Sato et al. ............... | 375/240.16 |
| 2005/0002455 | A1 * | 1/2005 | Lin et al. ................ | 375/240.16 |

FOREIGN PATENT DOCUMENTS

| | | |
|---|---|---|
| JP | 01-295379 | 11/1989 |
| JP | 05-037922 A | 2/1993 |
| JP | 10-191352 A | 7/1998 |
| JP | 2000-236552 A | 8/2000 |
| JP | 2000-253407 A | 9/2000 |
| JP | 2001-028754 A | 1/2001 |
| JP | 2001-339725 A | 12/2001 |

OTHER PUBLICATIONS

Japanese Notification of Reasons for Refusal, w/ English translation thereof, issued in Japanese Patent Application No. JP 2004-187953 dated Sep. 29, 2009.

* cited by examiner

*Primary Examiner*—Behrooz Senfi
(74) *Attorney, Agent, or Firm*—McDermott Will & Emery LLP

(57) ABSTRACT

In relation to search positions within a search range determined with a reference image block located in the same position as a standard block of interest, correlation computation is performed by parallel processing under a pipeline method through use of a plurality of correlation computing units. A correlation extreme value is searched while the center position is sequentially moved on the basis of a predetermined search position setting standard according to the result of correlation computation. Further, sub-sampled image data for a plurality of channels corresponding to the search positions are retained in system memory for a plurality of channels, and correlation computation is performed in connection with search positions through parallel processing under a pipeline method through use of the plurality of correlation computing units.

10 Claims, 18 Drawing Sheets

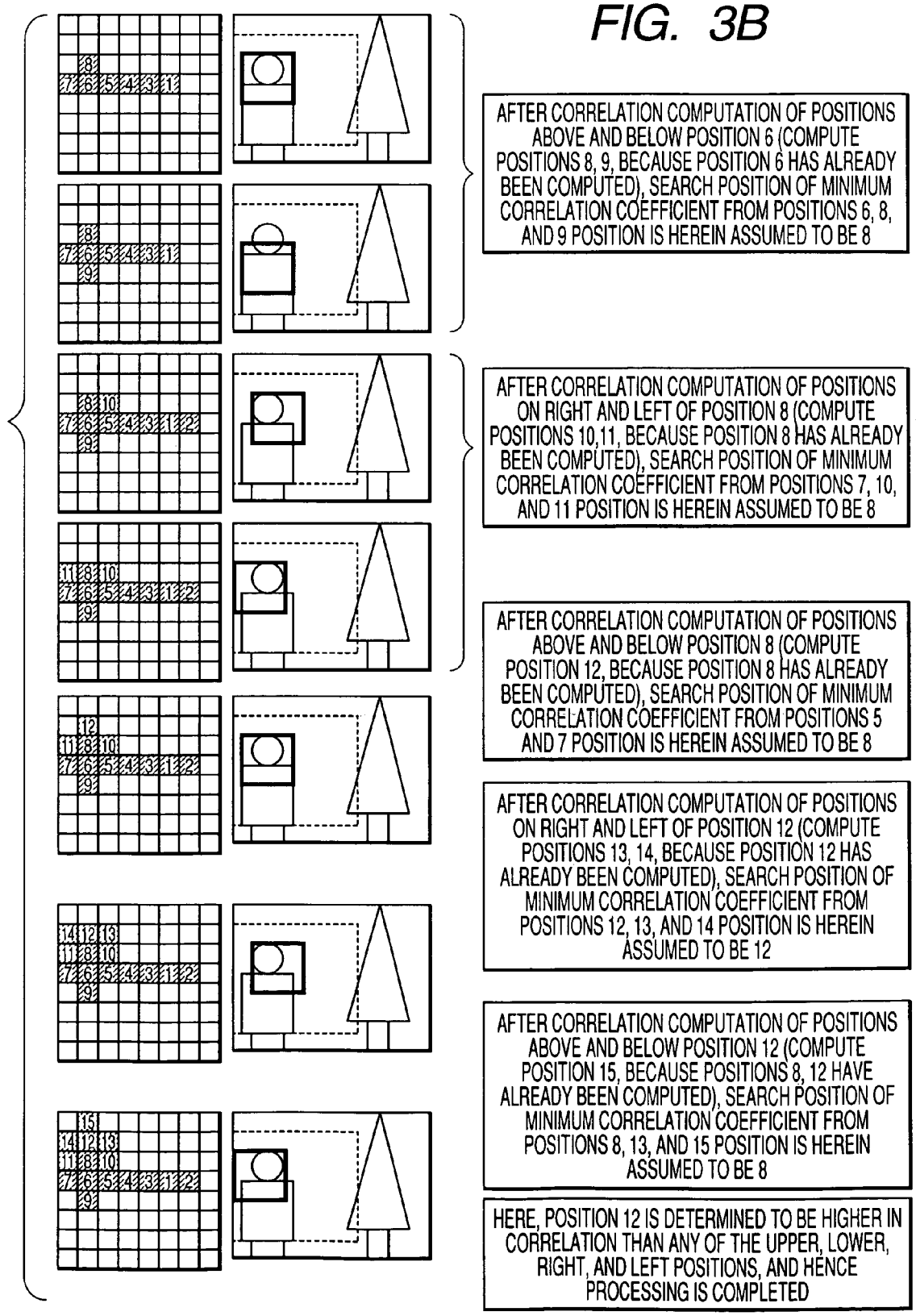

FIG. 4
STANDARD BLOCK
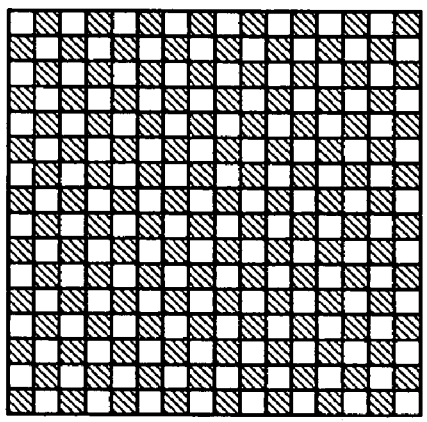
REFERENCE BLOCK: EVEN-NUMBERED POSITIONS
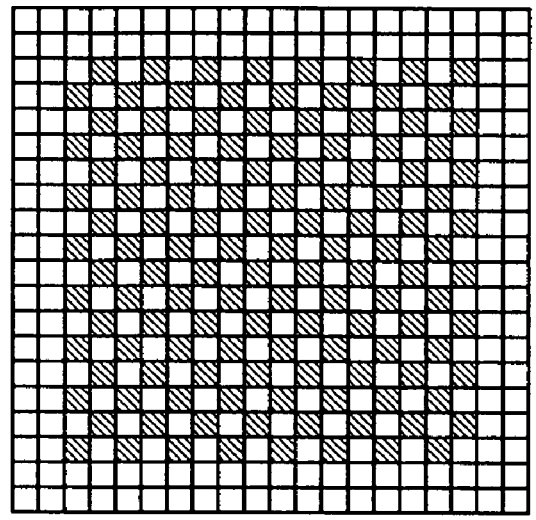
REFERENCE BLOCK: ODD-NUMBERED POSITIONS
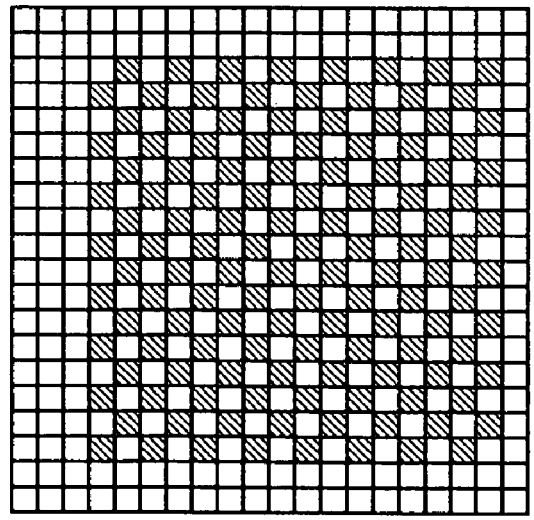

FIG. 8A
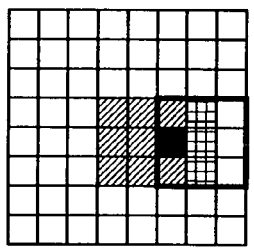

FIG. 8B
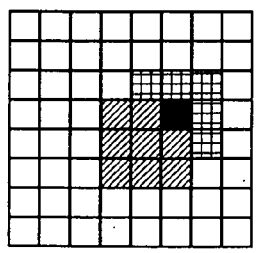

FIG. 8C
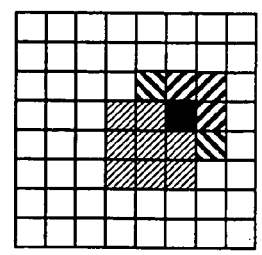

■ POSITION OF MINIMUM CORRELATION COEFFICIENT

THICK FRAME DENOTES THE NEXT SEARCH RANGE

⊞ SEARCH POSITION SETTING STANDARD 1
▨ SEARCH POSITION SETTING STANDARD 2
▩ SEARCH POSITION SETTING STANDARD 3

FIG. 8D1
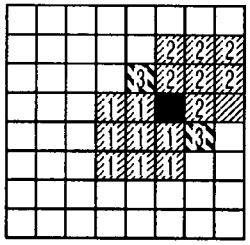

AFTER MOVEMENT IN DIAGONAL DIRECTION, POSITION HAS COINCIDED WITH POSITION OF MINIMUM CORRELATION COEFFICIENT OF LAST TIME. HENCE, RANGE INCLUDING ALL SEARCH POSITION SETTING STANDARDS 3 IS SET

FIG. 8D2
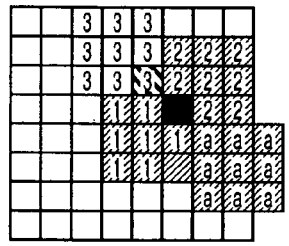

SINCE ONE OF SEARCH POSITION SETTING STANDARDS 3 HAS ALREADY BEEN SEARCHED, SETTING IS MADE SUCH THAT THE REMAINING SEARCH POSITION SETTING STANDARD 3 IS INCLUDED AND A MAXIMUM NUMBER OF UNSEARCHED POSITIONS ARE INCLUDED

FIG. 8D3
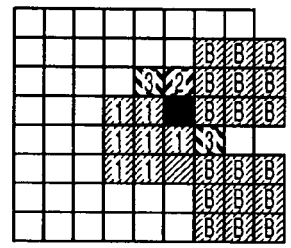

SINCE SOME OF SEARCH POSITION SETTING STANDARDS 1 HAVE ALREADY BEEN SEARCHED, SETTING IS MADE SO AS TO INCLUDE ALL OF THE SEARCH POSITION SETTING STANDARDS 2, 3

FIG. 8E
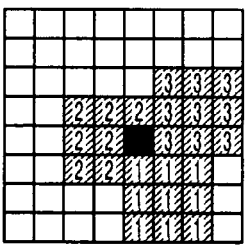

▨ SEARCHED POSITION    ⊞ SEARCH RANGE

AFTER MOVEMENT IN DIAGONAL DIRECTION, SEARCH RANGE IS CHANGED TOWARD RIGHT (ALL OF SEARCH POSITION SETTING STANDARDS 1 ARE INCLUDED, AND SEARCHED SEARCH POSITIONS ARE NOT INCLUDED)

ONE BLOCK CORRESPONDS TO ONE SEARCH POSITION, POSITIONAL RELATIONSHIP BETWEEN BLOCKS CORRESPONDS TO THE AMOUNT OF SHIFT IN SEARCH POSITION

FIG. 11A1
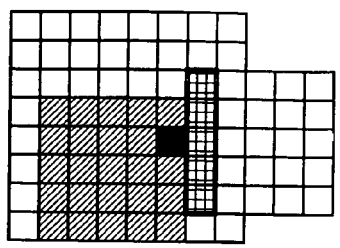
THICK FRAME DENOTES NEXT SEARCH RANGE
FIG. 11B
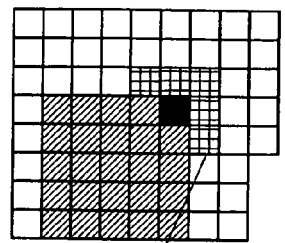
■ POSITION OF MINIMUM CORRELATION COEFFICIENT
⊞ SEARCH POSITION SETTING STANDARD 1
▨ SEARCH POSITION SETTING STANDARD 2
▧ SEARCH POSITION SETTING STANDARD 3
FIG. 11A2
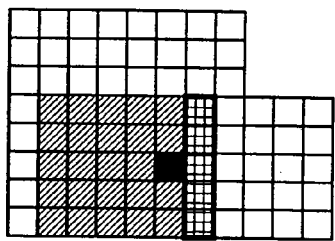
FIG. 11C
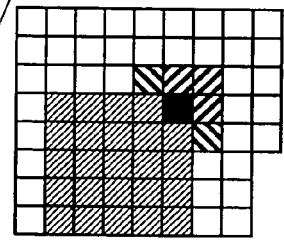
FIG. 11D1
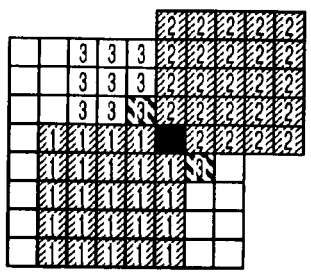
FIG. 11D2
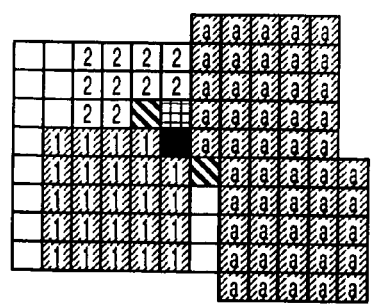

FIG. 13A
SUB-SAMPLED STANDARD BLOCK
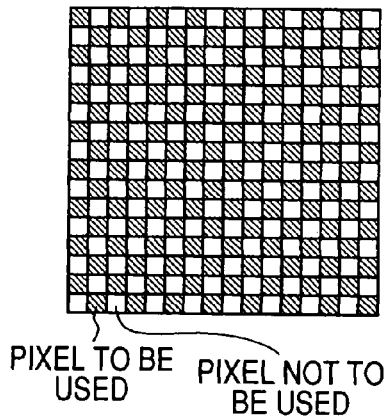
PIXEL TO BE USED   PIXEL NOT TO BE USED
FIG. 13B
SUB-SAMPLED REFERENCE BLOCK MEMORY 1
(THICK FRAME DENOTES SEARCH POSITION: l)
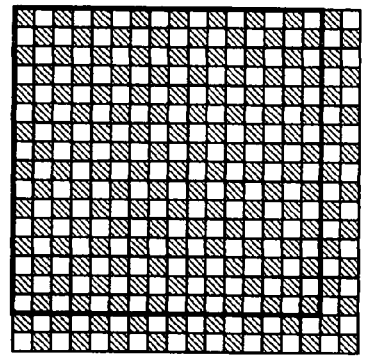
FIG. 13C
SUB-SAMPLED REFERENCE BLOCK MEMORY 2
(THICK FRAME DENOTES SEARCH POSITION: T)
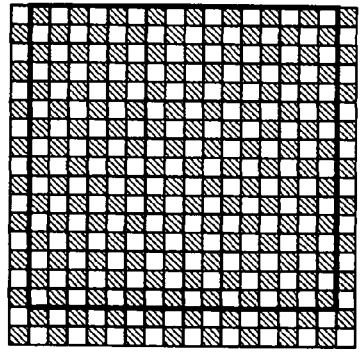
FIG. 13E
SEARCH POSITIONS
| l | T | t |
|---|---|---|
| L | C | R |
| b | B | r |
FIG. 13D
SUB-SAMPLED REFERENCE BLOCK MEMORY 1
(THICK FRAME DENOTES SEARCH POSITION: t)
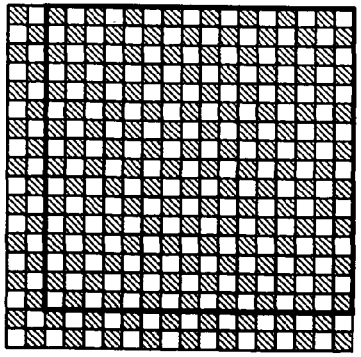

MOTION VECTOR DETECTING APPARATUS AND METHOD FOR DETECTING MOTION VECTOR

This application is based on Japanese Patent Application No. 2004-187953, which is incorporated herein by reference.

BACKGROUND OF THE INVENTION

1. Field of the Invention

The present invention relates to a motion vector detecting apparatus and a method for detecting a motion vector used in a motion picture compression encoder or the like.

2. Description of the Related Art

A motion detection scheme of block-matching type, where matching areas are searched from two different images in connection with a moving object to thus detect a motion vector of the matching areas, is a technique important for monitoring a general image or the like. This scheme has recently come into use as a basic technique, particularly for a moving picture compression encoding technique, such as MPEG for highly-efficiently encoding a moving picture. Detection of a motion vector involves processing entailing an enormous amount of computation, and many techniques have hither to been developed with a view toward rendering computation faster and more efficient (see, e.g., JP-A-1-295379).

A motion vector sensor having correlation computation means such as that shown in a block diagram shown in FIG. 1 has hitherto been available. A motion vector of a noteworthy area (hereinafter called an "input block") of an input image is detected through use of a preceding frame (hereinafter called a "reference image") retained by reference image memory 102 and a current frame (hereinafter called an "input image") retained by input image memory 101. In this case, as illustrated in a conceptual drawing of a search range shown in FIG. 2, a correlator 103 determines a correlation coefficient of the input block and a correlation coefficient of another image area (hereinafter called a "reference block") which is identical in size with the input block and which is located in a position vertically or horizontally distant from the input block, with a location in the reference image corresponding to the location of the input block being taken as a reference position for starting a search. The thus-determined correlation coefficients are stored in correlation coefficient memory 104.

The correlation coefficients of the respective input blocks are compared with each other by a comparator 105. Search standard positions are shifted to a location where maximum correlation is achieved (i.e., the minimum correlation coefficient is achieved). Thus, a location where the correlation of the search standard positions becomes maximum is searched while reference blocks in a direction where correlation coefficients are not yet computed are being subjected to correlation operation.

FIG. 3 is a view for describing the method by means of a specific example, and the method is called a one-at-a-time method. By reference to FIG. 3, a related one-at-a-time method is described. First, a correlation coefficient of a search position 1 where search is started is computed. Next, a correlation coefficient of a right search position 2 and that of a left search position 3 are computed in a time-series fashion, and a comparator finds a minimum value from among the correlation coefficients of the search positions 1 to 3. Here, on the assumption that the correlation coefficient of the search position 3 is smaller than those of the other search positions, the correlation coefficient of a position (a search position 4) to the left of the search position 3 is computed, and the comparator determines whether the correlation coefficient of the search position 3 is larger or smaller than that of the search position 4. the result of comparison is assumed to be (the correlation coefficient of the search position 4)<(the correlation coefficient of the search position 3).

In a case where the correlation coefficients have been computed in the same manner up to the correlation coefficient of a search position 7, when there is obtained a relationship of (a correlation coefficient of a search position 6)<(the correlation coefficient of the search position 7) (i.e., the correlation coefficients of the right and left search positions are larger than the correlation coefficient of the center search position), the correlator 103 determines a correlation coefficient of an upper search position 8 and a correlation coefficient of a lower search position 9 with reference to the search position 6 in a time-series fashion. The comparator 104 determines the minimum correlation value from the correlation coefficients of the search positions 6, 8, and 9. Provided that the correlation coefficient of the search position 8 is presumed to be minimum, a correlation coefficient of a right search position 10 and that of a left search position 11 with reference to the search position 8 are computed, and the comparator 103 determines the minimum value among the thus-computed correlation coefficients.

Subsequently, the correlation coefficient of the right search position and that of the left search position are determined in the same manner. The search position having a higher degree of correlation (i.e., a smaller correlation coefficient) is taken as the center of search. When the correlation coefficient of the center search position is the largest when compared with that of the right search position and that of the left search position, a correlation coefficient of an upper search position and that of a lower search position are searched, whereby the reference is changed to a position having a higher degree of correlation. Search of a position where the correlation of the center with respect to those of the upper, lower, right, and left search positions becomes maximum is finally pursued, thereby detecting as a motion vector the search position which exhibits the maximum correlation. As mentioned above, according to the related method, computation of the correlation coefficients of adjacent search positions and determination of the position exhibiting the maximum correlation are performed through consecutive processing.

A common correlation operation method is for subjecting to addition an absolute value of a difference between the reference image and the input image. A formula for computing a correlation coefficient is shown in Equation 1.

$$S = \sum_{x=0}^{Nx} \sum_{y=0}^{Ny} |I(Px+x, Py+y) - R(Px+x+dx, Py+y+dx)| \quad \text{[Equation 1]}$$

$Nx, Ny$ ... lateral and longitudinal size of a block $I(x, y), R(x, y)$ ... image data pertaining to the position $(x, y)$ of an input image $Px, Py$ ... reference retrieval positions $dx, dy$ ... the amount of deviation from the retrieval reference positions As indicated by the above formula, the correlating operation requires a lot of computing operations. Therefore, as shown in FIG. 4, there has generally been performed a processing method for dividing blocks into a group of blocks located in even-numbered positions and a group of blocks located in odd-numbered positions in advance to thus sample image data (hereinafter called "sub-sampling"), thereby diminishing the number of computing operations required to perform correlating operation.

Under the above-described related-art method, only one correlating operator is provided. Therefore, there exists a problem of search of the maximum correlation position involving consumption of an extremely long time. For instance, in the embodiment shown in FIG. 3, performance of fifteen correlating operations is required.

Computation of a correlation coefficient usually entails consumption of much time. Therefore, under a method for shortening the time by sub-sampling the image data pertaining to the standard blocks and the image data pertaining to the reference blocks, the sub-sampled image data pertaining to the reference blocks in the even-numbered positions differ from the sub-sampled image data pertaining to the reference blocks in the odd-numbered positions as shown in FIG. 4.

For instance, in FIG. 4, the sub-sampled image data required to compute blocks of the first row differ from the sub-sampled image data required to compute blocks of the second row. Eventually, pipeline processing becomes impossible to perform, because of the sub-sampling operations. When compared with a case where computing operation is performed through pipeline processing, there arises a problem of the correlating operation requiring a much longer time.

SUMMARY OF THE INVENTION

The present invention provides a motion vector detecting apparatus and a method for detecting a motion vector, which render search of an extreme value faster than that performed by the related-art one-at-a-time method during the motion vector detection employed by a motion picture compression encoding device. Moreover, the present invention also aims at providing a motion vector detecting apparatus and a method for detecting a motion vector, which enable pipeline processing of even sub-sampled image data.

A motion vector sensor of the present invention is a motion vector sensor which detects a motion vector by a block matching method for computing a correlation between a standard block of interest of a standard image and an image block of a reference image, the sensor comprising a plurality of correlation computing unit which perform parallel processing of search positions within a search range defined while taking as a center position an image block located in the same position on the reference image as that of the standard block by a pipeline method, and search means which searches a correlation extreme value while sequentially moving the center position on the basis of a predetermined search position setting standard in accordance with a result of correlation computation.

According thereto, correlation computation is subjected to parallel processing through use of a plurality of correlation computing units by the pipeline system. Hence, search of an extreme value can be speeded up when compared with that performed under a related one-at-a-time method. Moreover, a correlation extreme value is searched while the center position is moved on the basis of predetermined search position setting standards, and therefore an extreme value can be searched efficiently.

The motion vector sensor of the present invention further comprises sub-sampled image generator for generating image data for a plurality of channels by sub-sampling the standard image and the reference image in accordance with the search position.

According thereto, the sub-sampled image data of the plurality of channels are used for correlation computation. Hence, deterioration of pipeline processing, which would otherwise be caused by sub-sampling, is avoided, thereby curtailing the time required to search a motion vector or extending the search range of the motion vector within a predetermined period of time. Thus, search of a motion vector of a quick-moving subject becomes possible.

In the present invention, the predetermined search position setting standard determines the search range so as to enable determination of a correlation extreme value after having moved the center position once or to enable determination of a correlation extreme value after having moved the center position twice.

According thereto, it becomes possible to determine a correlation extreme value after one movement of the center position of the search range or, at worst, two movements of the center position.

In the present invention, when the search range is expressed by a rectangular shape on the reference image and when a current position of the minimum correlation value is situated in the center of a side of the rectangular shape, the predetermined search position setting standard sets the search range such that the position comes to a center of a side of a next search range and such that a maximum number of unsearched search positions are included; and, when the current position of the minimum value is situated at a corner of the rectangular shape, the predetermined search position setting standard sets the search range such that the position comes to a center of a next search range.

According thereto, a search range is set so as to include all of the search positions complying with the first search position setting standards, thereby enabling a determination as to whether or not the current minimum correlation coefficient is an extreme value at the end of the next search.

In the present invention, when the search range is expressed by a rectangular shape on the reference image and when a current position of the minimum correlation value is situated in the center of a side of the rectangular shape, the predetermined search position setting standard sets the search range such that the position comes to a center of a side of a next search range and such that a maximum number of unsearched search positions are included, and, when the current position of the minimum value is situated at a corner of the rectangular shape, the predetermined search position setting standard sets the search range which includes the position and has been moved so as to include a maximum number of unsearched search positions.

According thereto, the movement for including the maximum number of unsearched search positions is enabled during oblique movement. Hence, occurrence of a drawback of an increase in the time which lapses before completion of search during oblique movement when setting the search range on the basis of the search position setting standard such that the position comes to the center of the next search range as previously mentioned can be prevented.

In the present invention, when the current position of minimum correlation position is situated at a corner of the rectangular shape and when a position of the minimum correlation value achieved after setting the search range including the position and having been moved so as to include the maximum number of unsearched search positions is the same position, the predetermined search position setting standard sets a search range centered on the position of the minimum correlation value.

According thereto, the current minimum value can be determined to be an extreme value after at least twice movements while a search speed in an oblique direction is being ensured. Hence, tracking of a quick-moving subject becomes possible, and wasteful computation is curtailed, thereby yielding an effect of diminishing consumed electric energy.

In the present invention, when the number of correlation computation operations has exceeded a predetermined number, a new search range is set by replacing the search position setting standard.

According thereto, when the number of correlative computation operations has become increased, the search position setting standard is replaced, to thus enable setting of a new search range. Hence, setting of the search range can be changed between the outset of initiation of search and the time when progress in search is made. As a result, search can be caused to immediately proceed to the vicinity of an extreme value of correlation coefficient. Thus, immediate convergence of search in the vicinity of the extreme value can be expected.

In the present invention, when the number of correlation computation operations has fallen short of a predetermined number, a new search range is set by replacing the search position setting standard.

According thereto, when the correlation minimum value has fallen short of a predetermined value, the search position setting standard is replaced, to thus enable setting of a new search range. Hence, setting of the search range can be changed between the outset of initiation of search and the time when a progress in search is made. As a result, search can be caused to immediately proceed to the vicinity of an extreme value of correlation coefficient. Thus, immediate convergence of search in the vicinity of the extreme value can be expected.

In the present invention, when a result of detection of a motion vector of a standard block adjacent to a current standard block is usable, the search position setting standard is selected according to an evaluation of whether or not a motion vector of the adjacent standard block is used, thereby setting a search range.

According thereto, when the motion vector of the adjacent standard block is used, a new search range can be set by replacing the search position setting standard. Hence, setting of the search range can be changed between the outset of initiation of search and the time when progress in search is made. As a result, search can be caused to immediately proceed to the vicinity of an extreme value of correlation coefficient. Thus, immediate convergence of search in the vicinity of the extreme value can be expected.

In the present invention, control is performed such that correlation computation of searched search positions is inhibited.

According thereto, correlation computation of searched search positions is inhibited, thereby curtailing wasteful computation and yielding an effect of reducing consumed electric energy.

The motion vector sensor of the present invention further comprises correlation coefficient memory for sequentially storing a correlation minimum value exhibiting the maximum correlation, comparator which detects a correlation minimum value exhibiting the maximum correlation and a search position in accordance with a progress in correlation computation, computation range setting unit which determines the next search range in accordance with the search position exhibiting the maximum correlation, and search completion determinator which determines whether or not the correlation minimum value of the maximum correlation position has reached a correlation extreme value.

A method for detecting a motion vector according to the present invention comprises specifying an address of a reference pixel in an image frame and an adjacent range N from the reference pixel, computing correlation between $(2N+1)^2$ blocks centered on the reference pixel and blocks which are offset from the $(2N+1)^2$ blocks by an amount of $M(1 \leq M \leq N)$ blocks, selecting blocks exhibiting the largest correlation among correlations with obtained $(2N+1)^2$ blocks, and outputting an address of a center pixel of the selected block.

According to the present invention, search of an extreme value can be speeded up when compared with that performed under a related one-at-a-time method. Moreover, a correlation extreme value is searched while the center position is moved on the basis of predetermined search position setting standards. Hence, search of the extreme value can be performed efficiently. There is yielded an effect of the ability to search a correlation extreme value after one movement of the center position of the search range or, at worst, two movements of the center position.

Further, according to the present invention, deterioration of the efficiency of pipeline processing due to sub-sampling is avoided, and the time required to search a motion vector can be curtailed, or the search range of a motion vector within a predetermined time can be enlarged. Thus, search of a motion vector of a quick-moving subject becomes possible.

The time required for computation is short, which in turn eventually enables a reduction in the consumption of electric energy required for processing, miniaturization of a portable device equipped with the motion vector sensor, and long hour driving of the device with batteries.

BRIEF DESCRIPTION OF THE DRAWINGS

FIG. 3B is a conceptual drawing of operation under a related-art one-at-a-time method for detecting a motion vector;

FIG. 4 is a view showing example sub-sampled standard blocks and example sub-sampled reference blocks;

FIG. 8 is a view showing a method for setting the next search range from the current position of the minimum correlation coefficient by means of search position setting standards;

FIG. 11 is a view showing a specific example of search of a position of the minimum correlation coefficient according to the third embodiment of the present invention;

FIG. 13 is a view for describing the manner in which positions where sub-sampling is performed are changed according to the search positions;

DETAILED DESCRIPTION OF THE PREFERRED EMBODIMENTS

Embodiments of the present invention will be described hereinbelow by reference to the drawings.

First Embodiment

Figure 6:
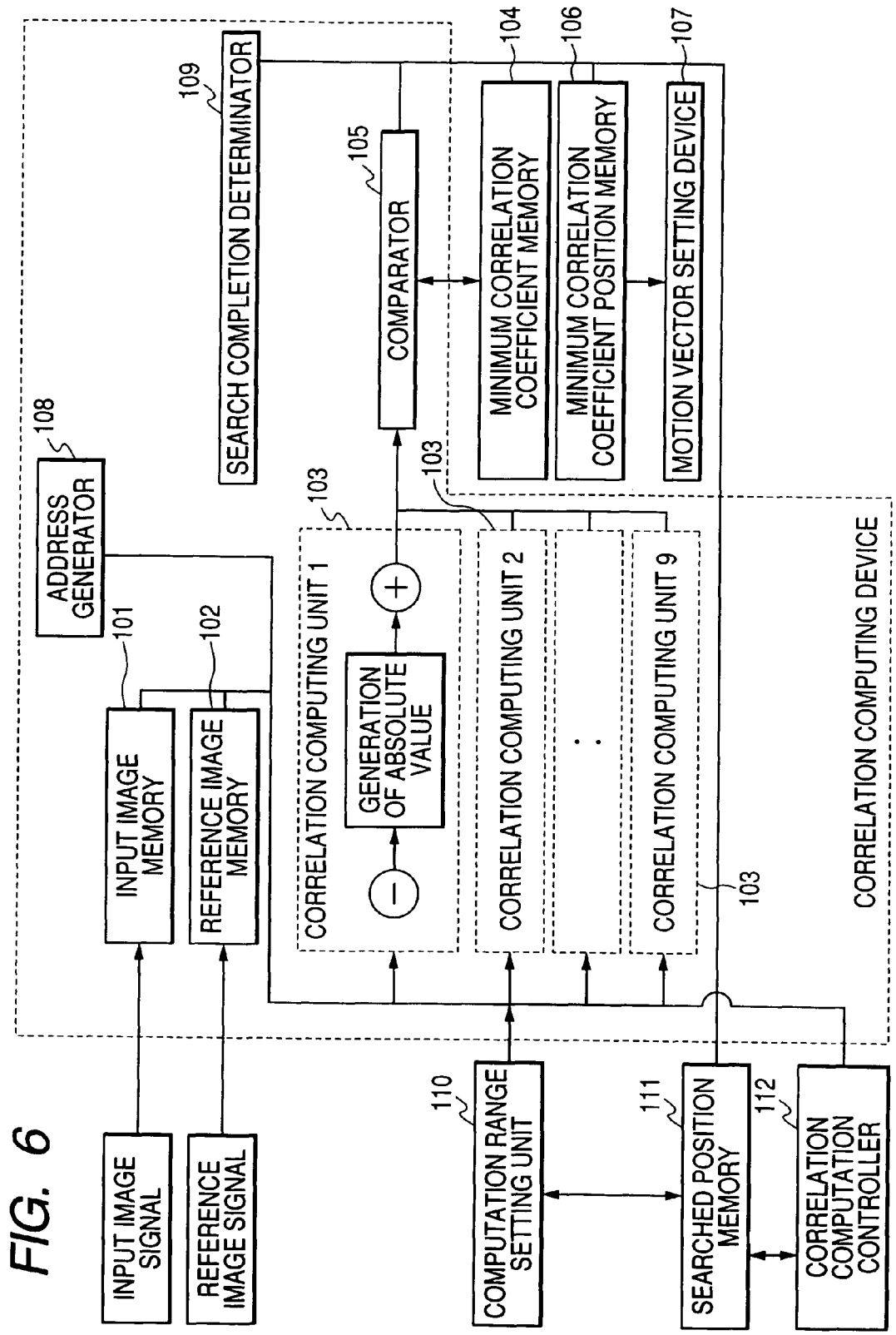
FIG. 6 is a block diagram showing the configuration of the motion vector sensor according to the first through fourth embodiments of the present invention.

FIG. 6 is a block diagram showing the configuration of a motion vector sensor according to a first embodiment of the present invention. In the embodiment, a correlation computing device is configured so as to be able to subject to pipeline (or parallel) processing correlation operations in eight directions centered on a certain search standard position; that is, an upward direction, a downward direction, a right direction, a left direction, an upper right direction, a lower right direction, an upper left direction, and a lower left direction.

In FIG. 6, reference numeral 101 designates input image memory for retaining an input image; 102 designates reference image memory for retaining a reference image; 103 designates a plurality of correlation computing units for computing correlation coefficients (a correlation computing device 1 to a correlation computing device 9); 104 designates minimum correlation coefficient memory; 105 designates a comparator; 106 designates a minimum correlation coefficient position memory; 107 designates a motion vector setting device; 108 designates an address generator sequentially generating addresses of unillustrated line memory; 109 designates search termination determinator; 110 designates computing range setting unit; 111 designates searched position memory; and 112 designates correlation computation control unit. Each of the correlation computing units 103 has therein a difference operator for computing a difference between an input image and a reference image, a circuit for determining an absolute value of the difference, and an adder for subjecting the result to addition.

Figures 5A, 5B:
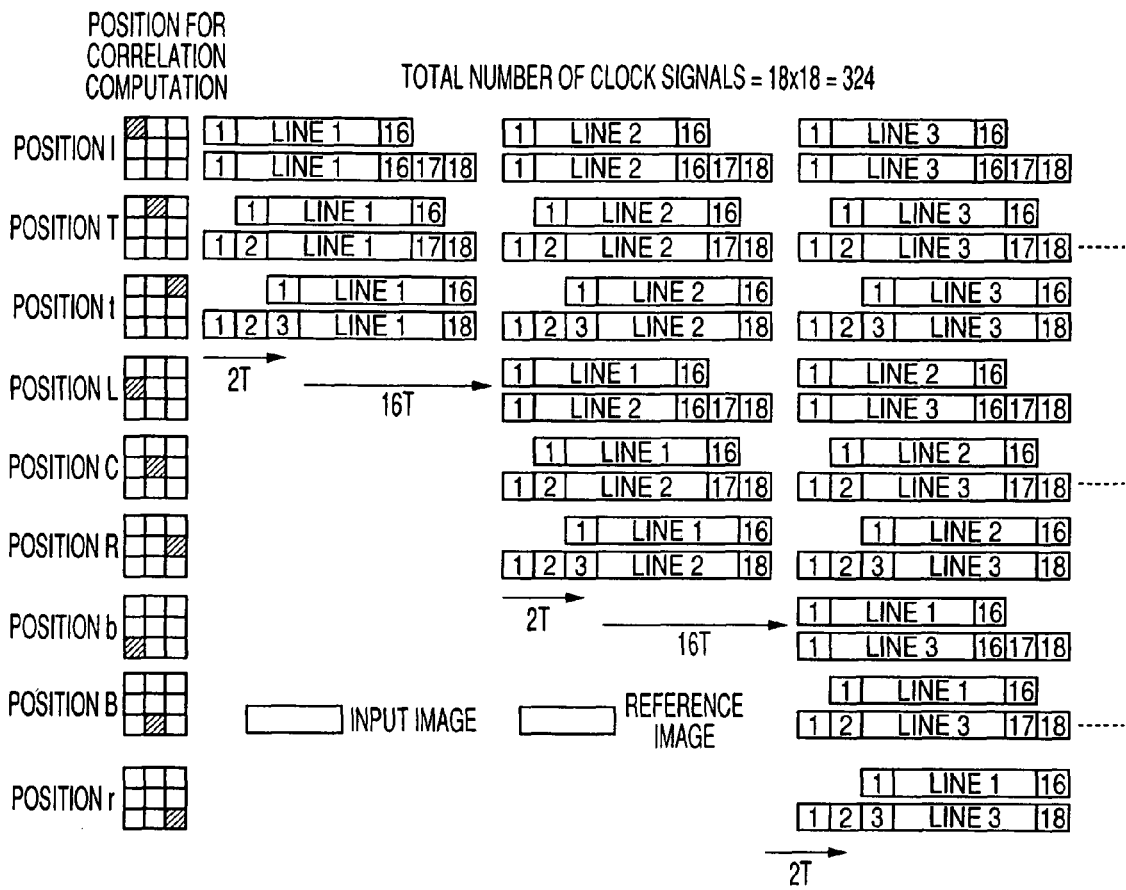
FIG. 5 is a view showing timings of pipeline processing of a correlation computing unit in the motion vector sensor according to first through fourth embodiments of the present invention.

By reference to FIGS. 5 and 6, pipeline processing for computing correlation coefficients of the nine positions centered on the search standard position will be described in detail. The present embodiment is based on the assumption that the input image and the reference image are not subjected to sub-sampling. FIG. 5A is a view showing a timing at which the correlation computing device 1 to the correlation computing device 9, all being shown in FIG. 6, compute the correlation coefficient of the center position and those of surrounding positions in the eight directions (the correlation coefficients of all the nine positions).

FIG. 5B is a view showing the configuration of input image data and reference image data, both of which are required when correlation of all of the nine positions is computed. In relation to a standard block of 16×16 pixels, a reference image of 18×18 pixels which is broader than the reference block in the vertical and horizontal directions by one pixel is required.

In FIG. 5A, a first row is an operation timing of the correlation computing unit 1 which performs correlation operation of an upper left position (position 1) of the reference position. Similarly, second row and subsequent rows are operation timings of the correlation computing units 2 to 9 of positions T, "t," L, C, R, "b," B, and "r."

First, image data pertaining to a line 1 of the standard block (16 pixels) in the input image memory 101 and image data pertaining to line 1 of the reference image (18 pixels) in the reference image memory 102 are read to line memory 1 (not shown) and line memory 2 (not shown), respectively. The correlation computing unit 1 reads the pixel data from the line memory 1 and the line memory 2 by means of the addresses sequentially generated by the address generator 108. A difference between the sets of pixel data is computed by means of the difference operator, and the absolute value of the difference is subjected to addition, thereby computing a correlation coefficient 1 of the line 1.

A difference operator of the correlation computing unit 2 starts operation with a time lag of one clock signal behind the difference operator of the correlation computing unit 1, computes a difference between the sets of pixel data read from the line memory 1 and the line memory 2, and subjects the absolute value of the difference to addition, thereby computing a correlation coefficient T of the line 1.

A difference operator of the correlation computing unit 3 starts operation with a time lag of two clock signals behind the difference operator of the correlation computing unit 1, computes a difference between the sets of pixel data read from the line memory 1 and the line memory 2, and subjects the absolute value of the difference to addition, thereby computing a correlation coefficient "t" of the line 1.

When the correlation computing units 1 to 3 have finished computation of the pixel data stored in the line memory 1 and in the line memory 2 (lapse of 18 clock signals), the image data pertaining to the line 2 of the reference image (18 pixels) are loaded into the line memory 2. Further, data pertaining to the line 2 of the standard block are loaded into the line memory 1. Data pertaining to the line 1 of the standard block are loaded into the line memory 3 (not shown). At this time, the data in the line memory may be transferred as the data pertaining to the line memory 3.

The correlation computing units 1 to 3 again perform the same operations in connection with the line memory 1 and the line memory 2, thereby continuously computing a correlation coefficient "l", a correlation coefficient T, and a correlation coefficient "t" of the line 2. The correlation computing units 4 to 6 also perform the same operations as do the correlation computing units 1 to 3 in connection with the line memory 1 and the line memory 3, thereby computing a correlation coefficient L, a correlation coefficient C, and a correlation coefficient R.

When the correlation computing units 1 through 6 have finished the above-described operations (lapse of 18 clock signals), the pixel data corresponding to the lines 3, 2, and 1 of the standard block are loaded into the line memory 1, the line memory 3, and line memory 4 (not shown). Further, pixel data pertaining to the reference image corresponding to the line 3 are loaded into the line memory 2.

Subsequently, the correlation computing units 1 to 6 repeat the above-described operation while updating the data in the line memory. The correlation computing units 7 to 9 also repeat the same operations as do the correlation computing units 1 to 3 in connection with the pieces of line memory 4 and 2.

Subsequently, storage of data into line memory and correlation operation are similarly iterated until the respective correlation computing units complete computation of correlation coefficients of the lines 1 to 16 of the standard block. Now, the search positions where computation of the correlation coefficients has become completed are sequentially stored in the searched position memory 111 (there may also be employed a method for setting flags corresponding to the locations without storing the positions).

In this embodiment, the correlation operation is performed through use of unillustrated line memory. However, there may be employed another configuration, wherein the address generator directly specifies the line address of line memory of the input image memory and that of the reference image memory to thus read pixel data without using line memory. The advantage of the configuration is also the same as that yielded by the above-described configuration.

Figure 1:
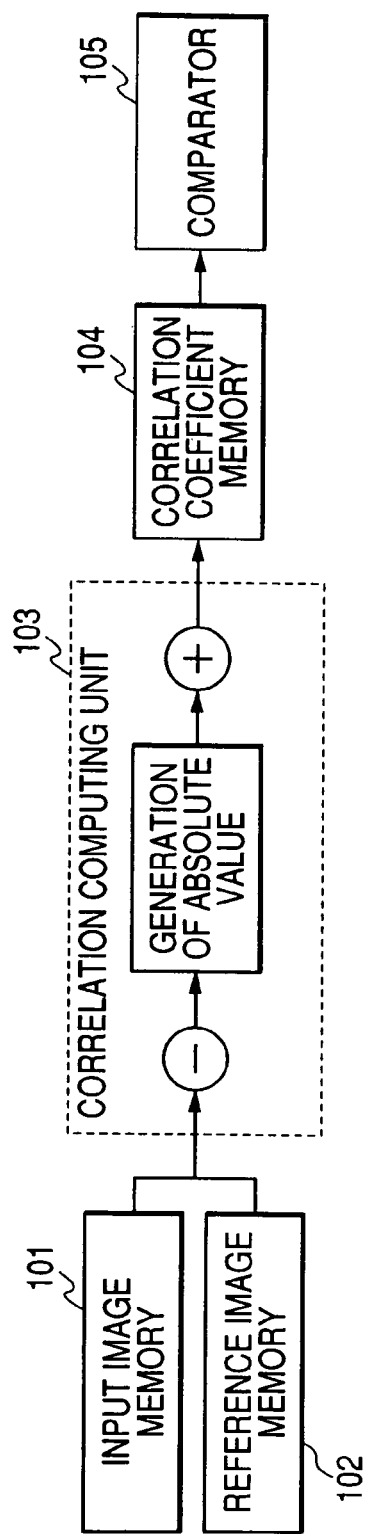
FIG. 1 is a block diagram showing an example configuration of a related-art motion vector sensor.

Conventionally, the correlation computing unit 103 shown in FIG. 1 operates in a time-series manner for computing the correlation coefficients in the upward, downward, right, and left directions. Provided that one clock signal is required to compute the absolute value of a difference of one pixel, 1024 clock signals (16 pixels×16 pixels×4 steps) are required in the related method. In contrast, the correlation computing units 1 through 9 shown in FIG. 6 operate in parallel with each other by means of the pipeline processing of the present embodiment, so that the operation cycles required to compute the correlation coefficients in the nine directions become 324 cycles ((16+2)×(16+2)).

When the correlation coefficient of the center becomes minimum; that is, all of the correlation coefficients in the surrounding eight directions are greater than that of the center, as a result of the correlation computing operations having been performed as the basic operation of the correlation computing operation shown in FIG. 6, the computing operation is completed with the center position being taken as a search result.

When having completed correlation operation of all of the nine positions including the input block and surrounding blocks for retrieving the correlation extreme value, the comparator 105 searches the minimum correlation coefficient from the minimum correlation coefficient stored in the minimum correlation coefficient memory 104 and the correlation coefficients acquired this time.

If all of the eight directions around the position of minimum correlation coefficient have already been searched, the search termination determinator 109 stores a determination of completion of the search and the result of search, thereby terminating subsequent search. As a result, continuous search of the minimum correlation coefficient becomes possible. For instance, even when a decrementing correlation coefficient has become an incrementing correlation coefficient during an $N+1^{th}$ search operation, the result of $N^{th}$ search operation can be immediately determined to be an extreme value.

When the search has not been completed and when the correlation coefficient of any one of the upper, lower, right, and left positions assumes the minimum value, the computing range determinator 110 sets a search range (search standard positions) by means of a search position setting standard 1 (see FIGS. 8A and 8B).

When the current position of the minimum value is the center (FIG. 8A), the search position setting standard 1 sets a search range (search standard positions) such that the position comes to the center of a side of the next search range and such that a maximum number of unsearched search positions (blank blocks in FIG. 8A) are included. Moreover, when the current position of the minimum value is a corner (FIG. 8B), the search range is set such that the position comes to the center of the next search range. Although only the right search standard positions are shown in FIG. 8A, the upward, downward, leftward, and rightward reference positions are identical with each other.

A search position setting means set the search range so as to include all of the search position setting standards 1, so that a determination can be made as to whether or not the current minimum correlation coefficient is an extreme value at a point in time when the next search operation is completed. The search standard positions are set among the search positions in the eight directions surrounding the current position of the minimum correlation coefficient. The reason for this is that a determination is made as to whether or not the minimum correlation coefficient of the current minimum correlation position is an extreme value in the next search operation.

When a minimum value is acquired in any of the diagonal directions, search standard positions are set so as to encompass all of the search positions complying with the search position setting standard 1 shown in FIG. 8B and a maximum number of unsearched positions other than those searched positions. The reason for this is the same as that in the case where the minimum value is acquired in any of the upward, downward, right, and left directions; that is, the current minimum value can be determined as an extreme value at a point in time when the next search operation is completed. Moreover, when the searched positions are included in the current search positions, correlation computation of those positions may be inhibited.

Figure 9:
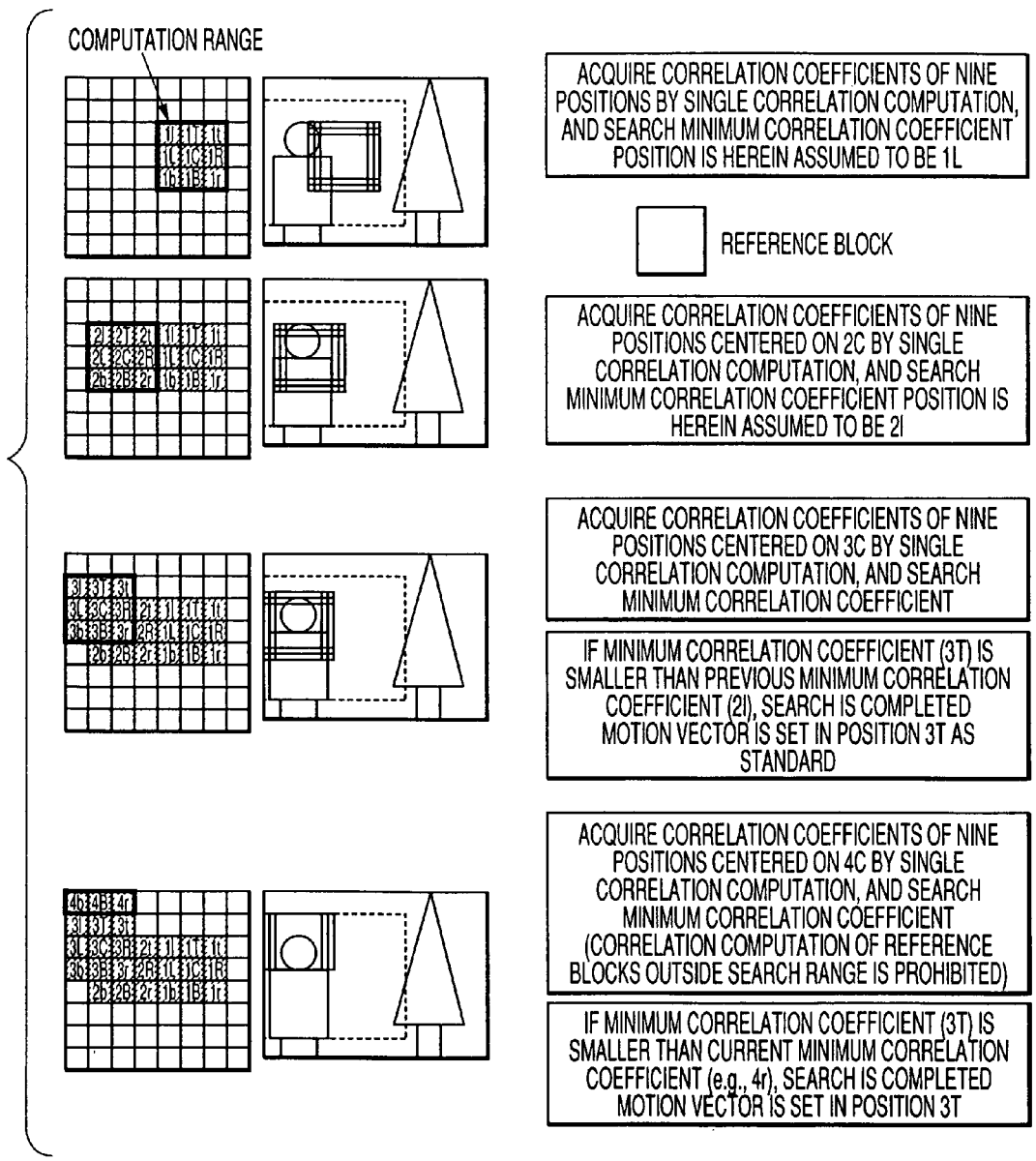
FIG. 9 is a view showing a specific example of search of a position of the minimum correlation coefficient according to the first embodiment of the present invention.
Figure 14:
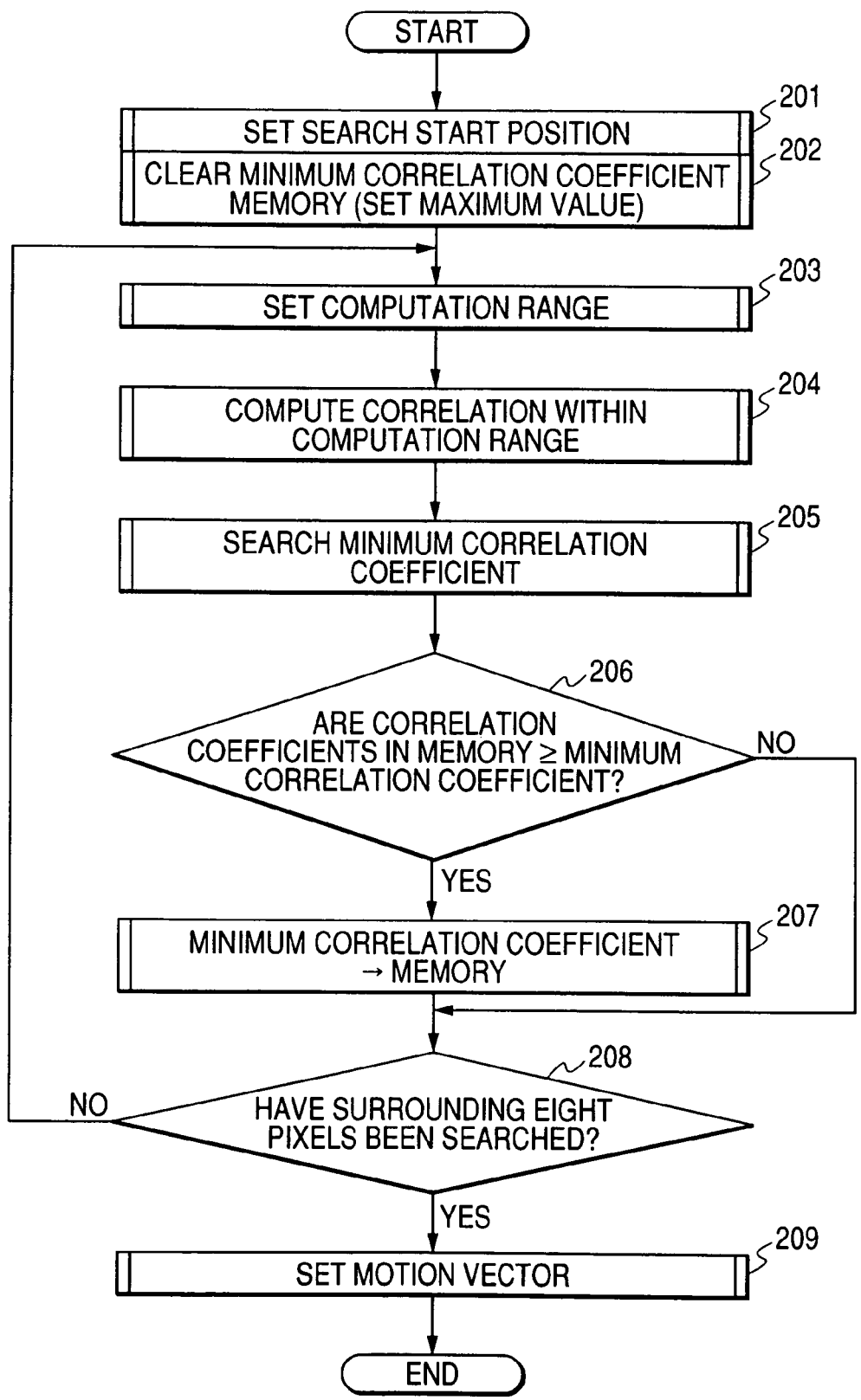
FIG. 14 is a flowchart of search of the position of the minimum correlation coefficient according to the first through fourth embodiments of the present invention.

FIG. 9 shows a specific example of the above-described search operation. A flowchart of progress in search is shown in FIG. 14. In FIG. 9, correlation coefficients in the computation range 1 indicated by the positions 1l to 1r are computed by means of correlation computation being executed by the correlation computing units 1 to 9 shown in FIG. 6. The position of the minimum correlation coefficient is determined by the comparator 105. Here, the position 1L is assumed to be the position of the minimum correlation coefficient.

The computation range setting unit 110 sets the computation range 2 (positions 2l to 2r) so as to encompass the search position setting standard 1 (2t, 2R, 2r in FIG. 9) and maximize an unsearched area. Determination of the correlation computation and the position of the maximum correlation of the computation range 2 are performed in the same manner as the search range 1. Here, the position 2l is assumed to be minimum.

The computation range setting unit 110 sets the computation range 3 (positions 3l to 3r) so as to encompass the search positions complying with the search position setting standard 1 in accordance with FIG. 8B, and performs correlation computation. Correlation computation is performed hereinbelow in the same manner, and search is continued until the position of the minimum correlation coefficient (the maximum correlation) is found in the center of the surrounding eight directions. A conceptual drawing shown in FIG. 9 shows the size of the reference block on a screen.

The above-described operation is described by reference to the flowchart shown in FIG. 14.

Step 201: Set a search start position to thus specify a computation range for the first operation.

Step 202: Clear the correlation coefficient memory.

Step 203: Specify the image data in the standard block and those in the reference block, both blocks corresponding to the searched positions within the computation range, by means of the computation range setting unit 110.

Step 204: Compute correlation coefficients of respective search positions through pipeline processing.

Step 205: Determine the minimum correlation coefficient within the computation range by means of the comparator 105.

Step 206: Compare the minimum correlation coefficient determined in step S205 with the minimum correlation coefficients stored in the memory, and update the minimum correlation coefficients stored in the memory in step S207, as required.

S208: Return to step S203 if eight pixels surrounding the search position of the minimum correlation coefficient in the memory have not been searched.

S209: Determine a motion vector on the basis of the minimum correlation coefficients in the memory and the corresponding positions.

Second Embodiment

In the first embodiment, the search position setting means determines a search standard position so that an extreme value can always be determined by the next search operation. However, according to this method, four search positions have already been searched by the time of a shift in a diagonal direction. Hence, in the case of a quick-moving subject, the time that elapses before completion of search (the number of computing operations) is increased. Therefore, there arises a problem of an increase in the electric energy consumed by computation and a failure to complete search of a motion vector within a predetermined period of time (a video frame rate).

In the upward, downward, right, and left directions, an extreme value can be determined without including unsearched positions. Therefore, a search position setting means according to the second embodiment enables maximum movement in only a diagonal direction without setting an area which enables determination of an extreme value in the next search reference position. However, if setting is made without an overlap between the current search standard position and the next search standard position, a false extreme value may be searched. For this reason, as shown in FIG. 8C, at least one overlap is provided.

However, even when the position of the minimum correlation is again the same position, the position cannot be determined as an extreme value. Therefore, as shown in FIG. 8C, a position required to determine an extreme value is added as a search position setting standard 3; a search range is set such that the position of the minimum correlation, which is again the same position, comes to the center of the range; and a correlation coefficient is computed.

Subsequently, in order to enable determination of the current minimum value as an extreme value during the search operation after the next search operation, setting is made so as to inevitably include the unsearched search position setting standard 2 shown in FIG. 8C, the search position setting standard 3 if one of the positions in the search position setting standard 2 has already been searched, and the maximum number of other unsearched positions.

Figure 3A:
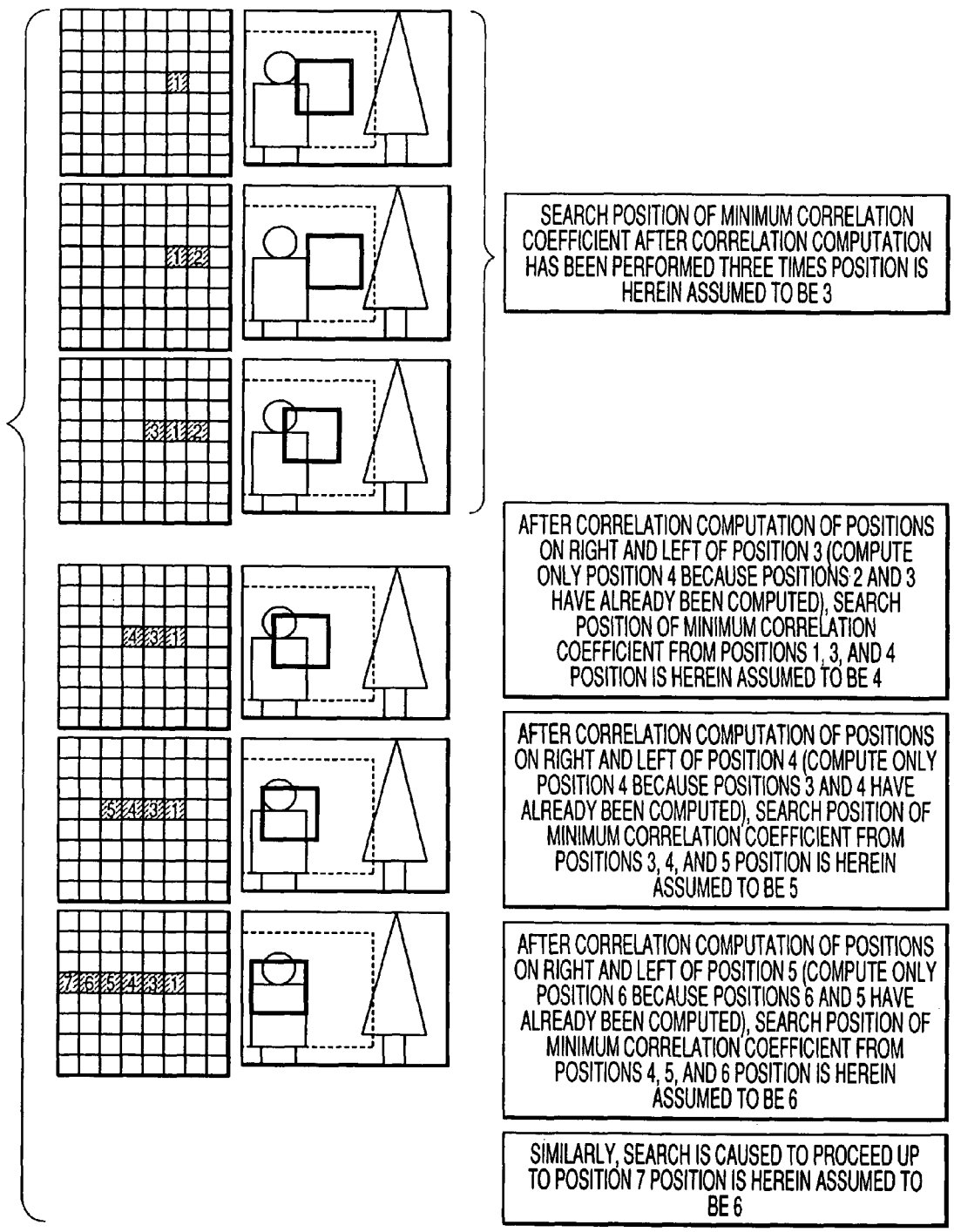
FIG. 3A is a conceptual drawing of operation under a related-art one-at-a-time method for detecting a motion vector.

FIGS. 8D1 to 8D3 show the embodiment. The search standard position is set among the search standard positions in the eight directions surrounding the current position of the minimum correlation coefficient. The reason for this is that a determination is made as to whether or not the current position of the minimum correlation is an extreme value during the search operation after the next search operation.

By means of setting the search standard position as mentioned above, the current minimum value can be determined to be an extreme value after at least two movements while the search speed in the diagonal direction is ensured. As a result, tracking of a quick-moving subject is enabled, and waste of computation is curtailed. Consequently, the effect of diminishing consumed electrical energy can be yielded.

Figure 10:
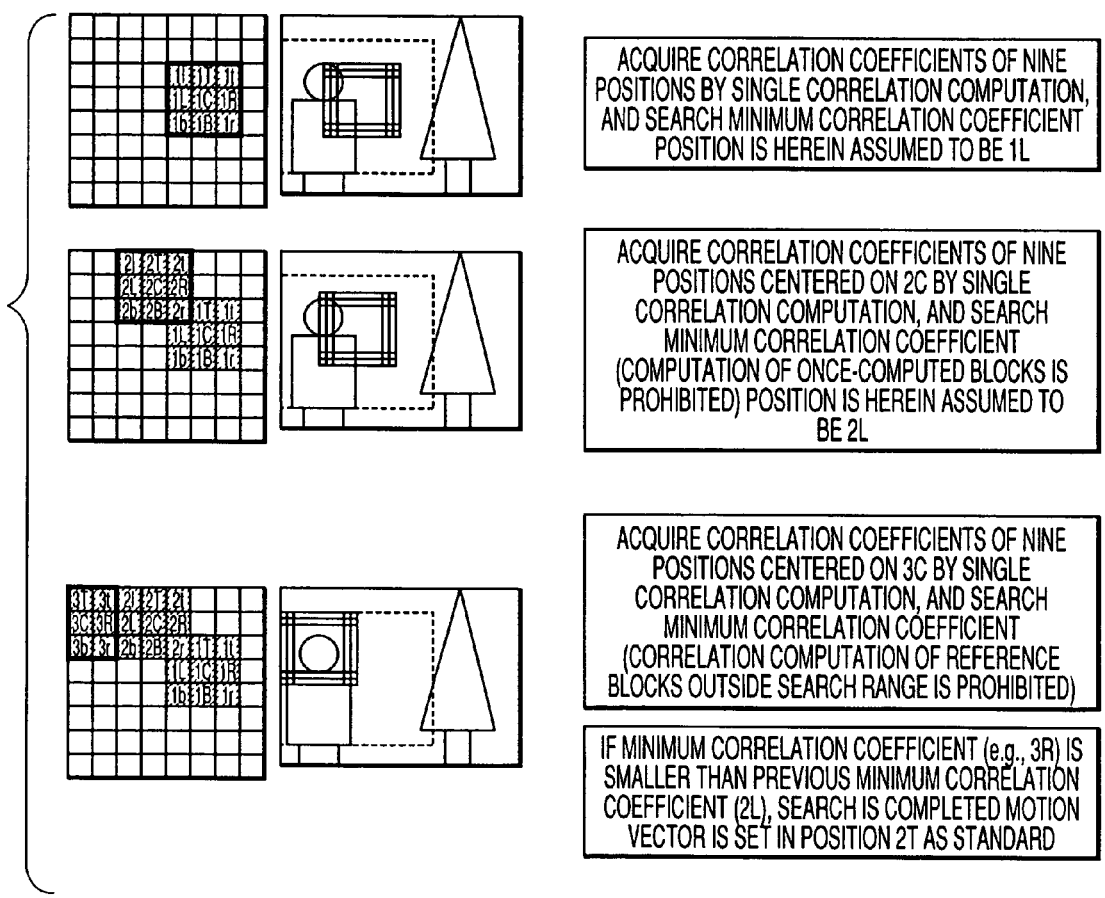
FIG. 10 is a view showing a specific example of search of a position of the minimum correlation coefficient according to the second embodiment of the present invention.

FIG. 10 shows a specific example of search in the present embodiment. In the first step, the position 11 is the minimum. Therefore, in the second step shown in FIG. 10, the computation range setting unit 110 sets a range centered on position 2C as a computation range which includes the search position setting standard 2 and where a maximum number of unsearched positions are present.

FIGS. 8D1 to 8D3 show operation of a computation range (search range) acquired immediately after completion of search. Here, numerals in blocks schematically designate the step of progress in computation; and indication "a" in blocks schematically denote search positions which have already been searched.

FIG. 8D1 shows the manner in which search is completed in three steps when a solid black block represents the maximum correlation. In the second step, the position of the maximum correlation (the black solid block) found in the first step is subjected to correlation computation which is to be performed for the computation range 2 including the search positions complying with the search position setting standard 2. Consequently, when the solid black block exhibits the maximum correlation, a computation range 3 is set so as to include the remaining search position setting standards 3.

Figure 2:
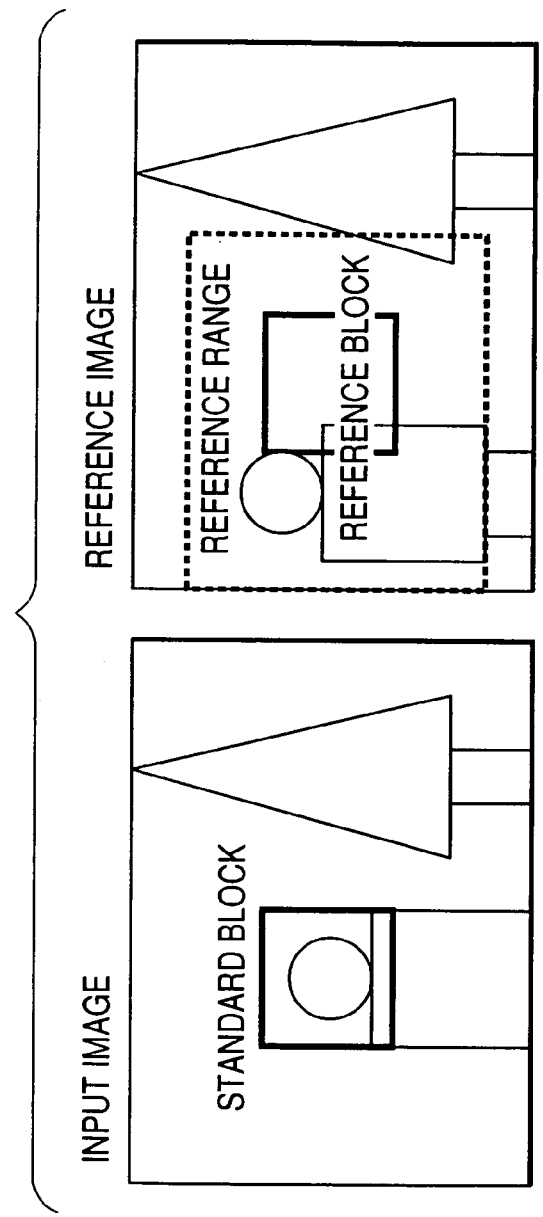
FIG. 2 is a conceptual drawing of a search range in a reference image for detecting a motion vector.

FIG. 8D2 shows the manner in which maximum correlation in the solid black block is detected when the search positions denoted by the indication "a" in the blocks have already been subjected to correlation computation. The computation range is set so as to avoid the blocks whose correlation coefficients have already been computed in the second step. Consequently, when search has progressed to the third step, the correlation coefficients of all the search position setting standards 2 and those of some of the search position setting standards 3 have already been computed. The computation range is set so as to include the search position setting standards 3 in the third step.

In FIG. 8D3, the search positions indicated by the indication "a" in the blocks have already been subjected to correlation computation. However, at a point in time when the search has entered the second step, some of the search position setting standards 2 have already been computed. Hence, the computation range is set so as to include the remaining search position setting standards 2, 3 in the second step.

FIG. 8E is an example where, when the search range is set in a lateral direction in the third step, the computation range is set such that overlaps with the blocks having already been subjected to correlation computation in the first step do not arise; that is, such that the number of unsearched positions is maximized.

Third Embodiment

The first and second embodiments have described a case where the search positions are 3×3; that is, nine. However, the same concept can also be applied even when the number of search positions has increased in excess of nine. However, in relation to the upward, downward, right, and left directions, the locations where the search positions are set are changed in accordance with the position where the minimum correlation coefficient is detected, in order to more efficiently search an extreme value. In the search range of 3×3, the search positions are set such that the range is extended in only one direction of the upward, downward, right, and left directions. For instance, when 5×5 search positions are provided, the search range can be set in three directions as shown in FIG. 11; that is, a directions lightly upward, a directions lightly downward, and in a right horizontal direction, in accordance with the position where the minimum value has been detected.

FIGS. 11A1 and 11A2 correspond to FIG. 8A. The search position setting standards 1 in a right horizontal location, an upper horizontal location, and a lower horizontal location (not shown) arise in relation to the upward, downward, right, and left directions. FIGS. 11B and 11C correspond to FIGS. 8B and 8C and show the search position setting standards 1 to 3 that enable operations corresponding to the first and second embodiments. Particularly, FIG. 11C is a view showing a method for setting the search position setting standards 2 and 3 when the position of the minimum correlation coefficient comes to one of the four corners.

By means of the operation corresponding to the first embodiment, a search range for the next step is set so as to include all of the unsearched search position setting standards 1 and the maximum number of unsearched search positions (blank blocks shown in FIG. 11), whereby the position of the minimum correlation coefficient is searched.

When any one of the four corners exhibits the minimum correlation coefficient, a search range for the next step is set so as to include all of the unsearched search position setting standards 2 by means of the operation corresponding to the second embodiment. When only one of the search position setting standards 2 has already been searched, a search range for the next step is set so as to include the search position setting standards 3 and the maximum number of other unsearched positions, whereby the position of the minimum correlation coefficient is searched.

FIGS. 11D1 and 11D2 show the manner in which the search range is moved when the search position setting standards 2 and 3 are used. FIG. 11D1 shows the manner in which the position of the maximum correlation (the solid black block) is determined in three steps. In the second step, the search range is set so as to include all of the search position setting standards 2. In the third step, all of the search position setting standards 2 have already been searched, and hence the search range is set so as to include all of the search position setting standards 2 and 3.

FIG. 11D2 shows the two most recent steps before the position of the maximum correlation is determined when the search positions denoted by the indications "a" in the blocks have already been subjected to correlation computation. In the second step, some of the search position setting standards 2 have already been searched before the two most recent steps. For this reason, the search range is set so as to include all of the search position setting standards 2 and 3.

Fourth Embodiment

The present embodiment adaptively switches the search position setting means described in connection with the first embodiment and the search position setting means described in connection with the second embodiment. At the outset of initiation of search, the search range is set in accordance with the second embodiment. When search has proceeded, the search range is set in accordance with the first embodiment. As a result, search can be caused to immediately proceed to the vicinity of an extreme value correlation coefficient. Immediate convergence of search in the vicinity of the extreme value can be expected.

The method of the first embodiment may be switched to that of the second embodiment according to the correlation coefficient. If the correlation coefficient assumes a predetermined size or more, the search range is set in accordance with the method of the second embodiment. When the correlation coefficient has assumed less than a predetermined size, the search range is set in accordance with the method of the first embodiment, whereby a similar effect can be expected.

Figure 15:
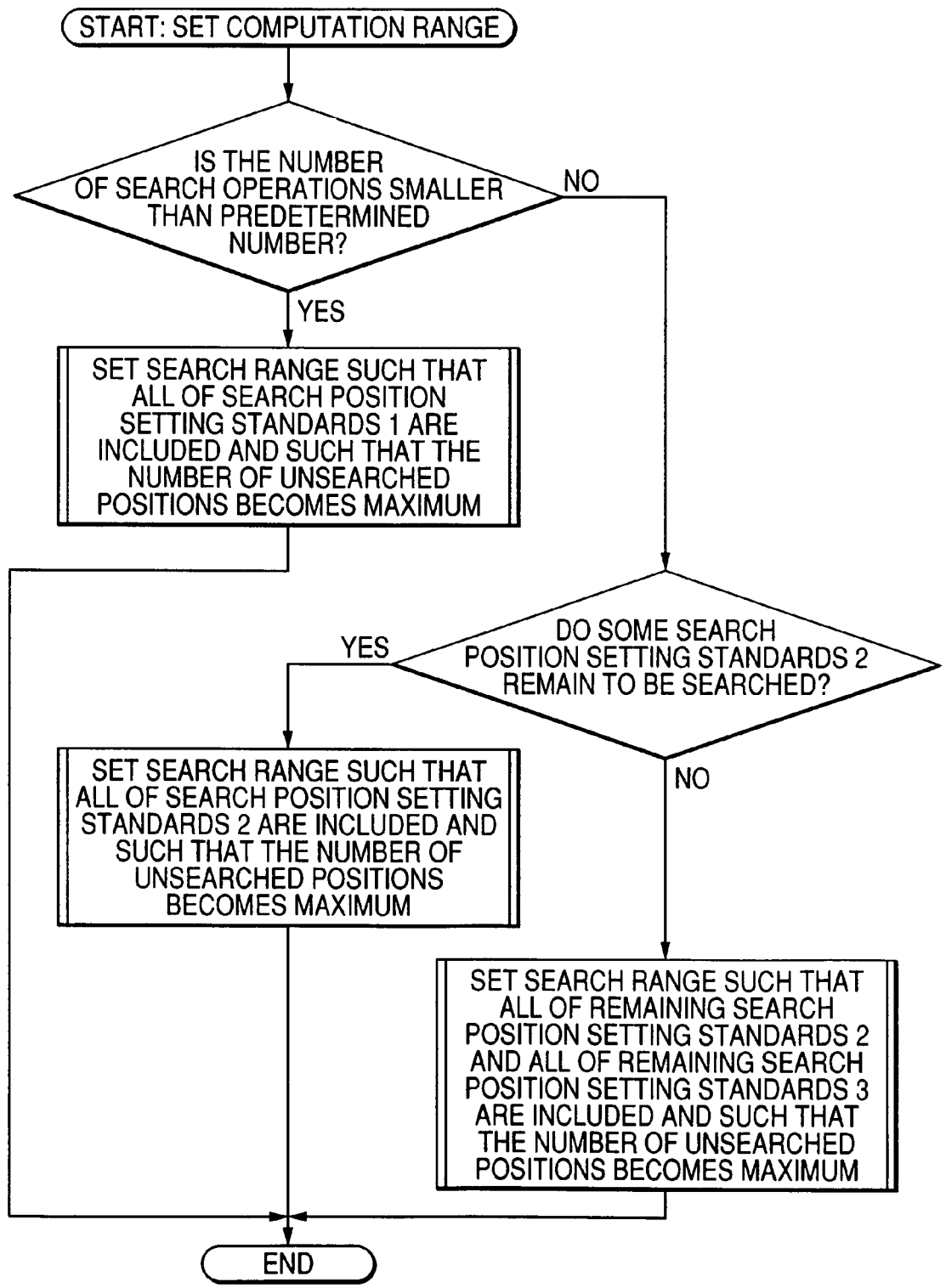
FIG. 15 is a flowchart of search range setting during search of the position of the minimum correlation coefficient according to the fourth embodiment of the present invention.
Figure 16:
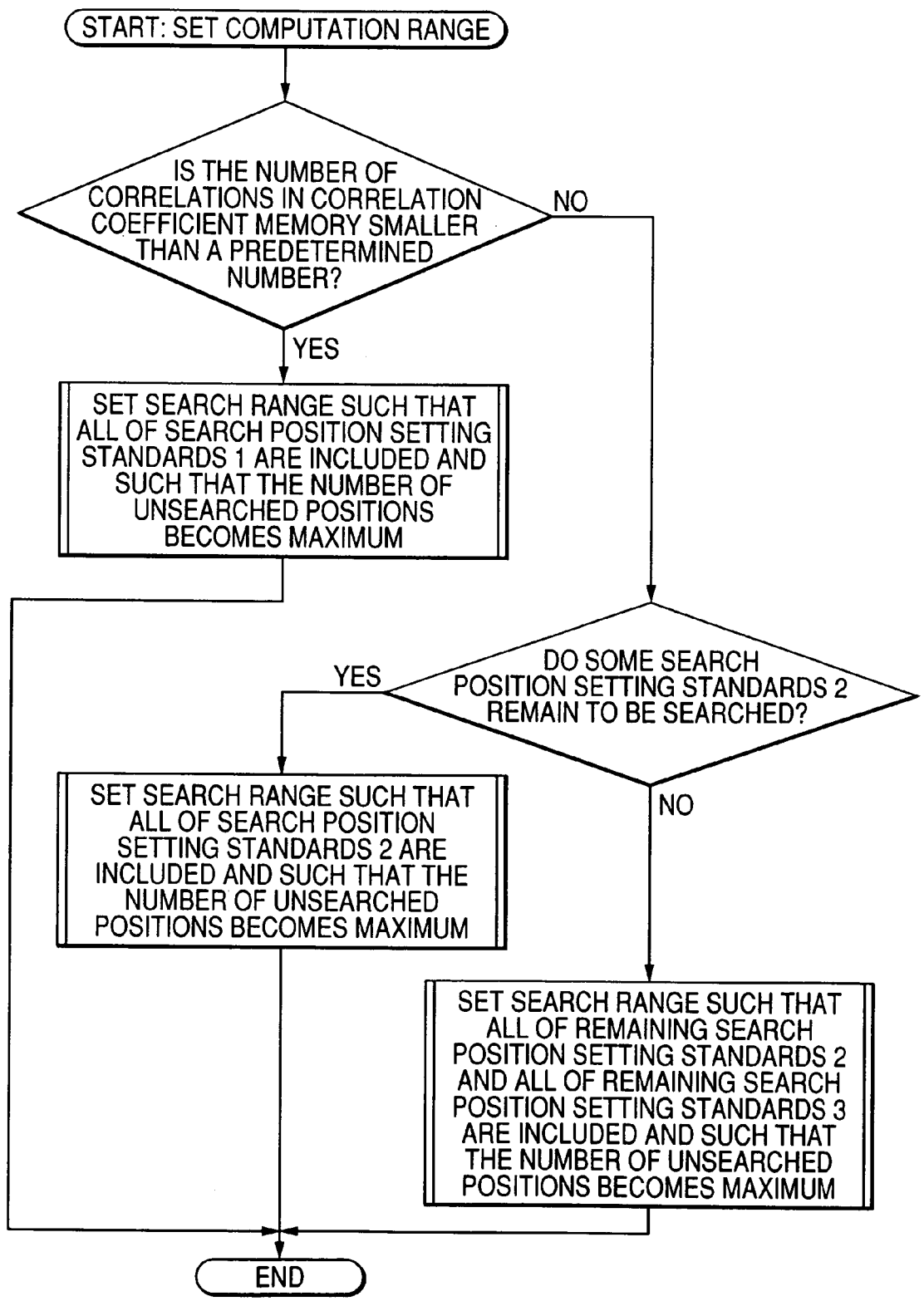
FIG. 16 is a flowchart of search range setting during search of the position of the minimum correlation coefficient according to the fourth embodiment of the present invention.
Figure 17:
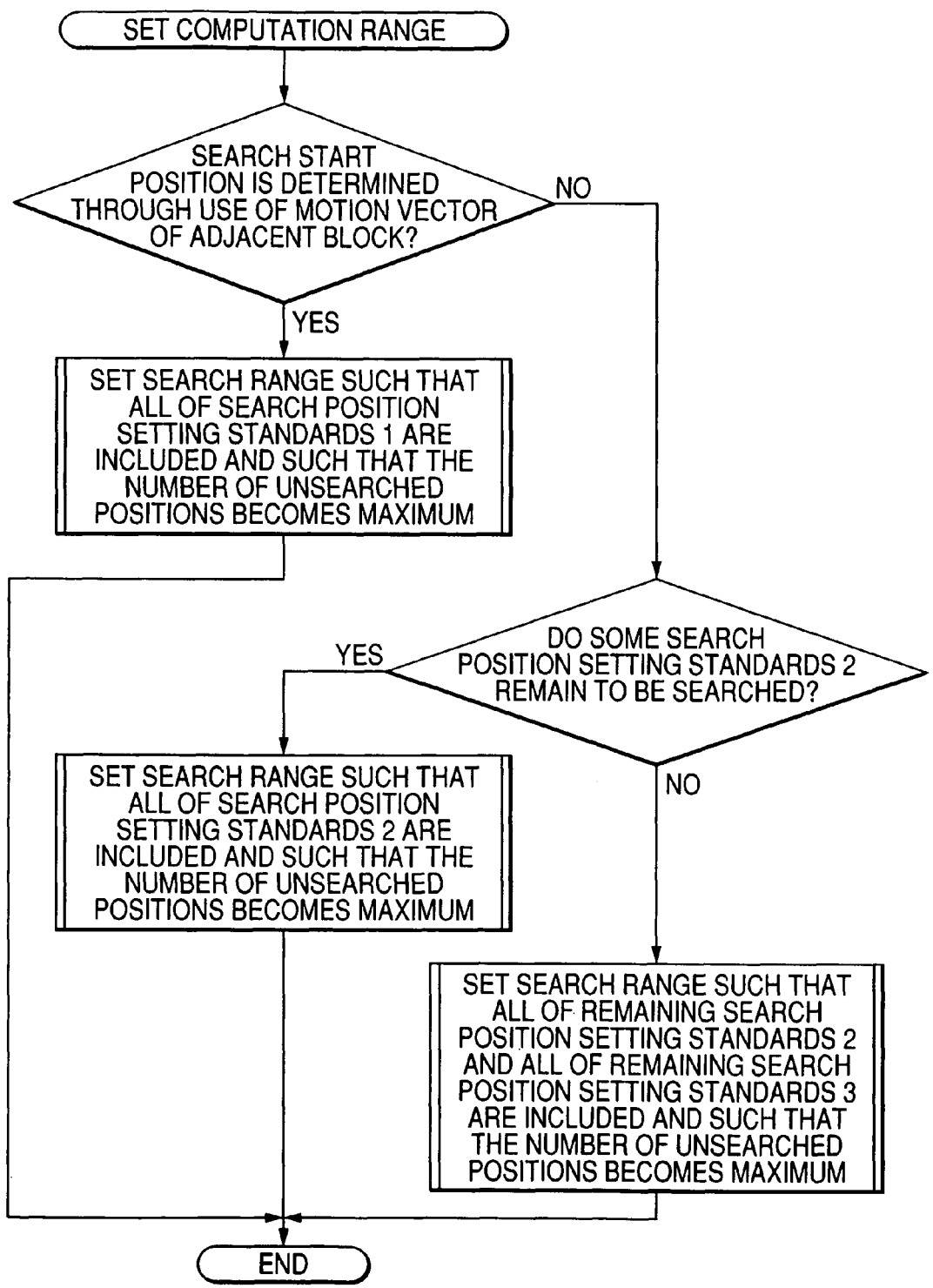
FIG. 17 is a flowchart of search range setting during search of the position of the minimum correlation coefficient according to the fourth embodiment of the present invention.

FIGS. 15 to 18 are flowcharts showing search procedures of the present embodiment. FIGS. 15 through 17 show only the computation range setting of step 3 in FIG. 14.

In FIG. 15, when the number of search operations; that is, the number of times correlation computation is performed, has exceeded a predetermined number, the search position setting standards are switched. In FIG. 16, when the size of the correlation coefficient of the current block has becomes smaller than the predetermined value, the search position setting standards are switched.

When the motion vector of a standard block adjacent to the standard block which is currently computed rather than the motion vector of the standard block which is currently computed has already been detected at the time of initiation of search, the search start position is determined through use of the result of detection, whereby a speedup in the search of the correlation coefficient up to the vicinity of the extreme value can be expected.

In order to control the position where search is started, the motion vector sensor of the present embodiment is equipped with start position setting unit 113, as shown in a block diagram of FIG. 7, which will be described later.

Figure 18:
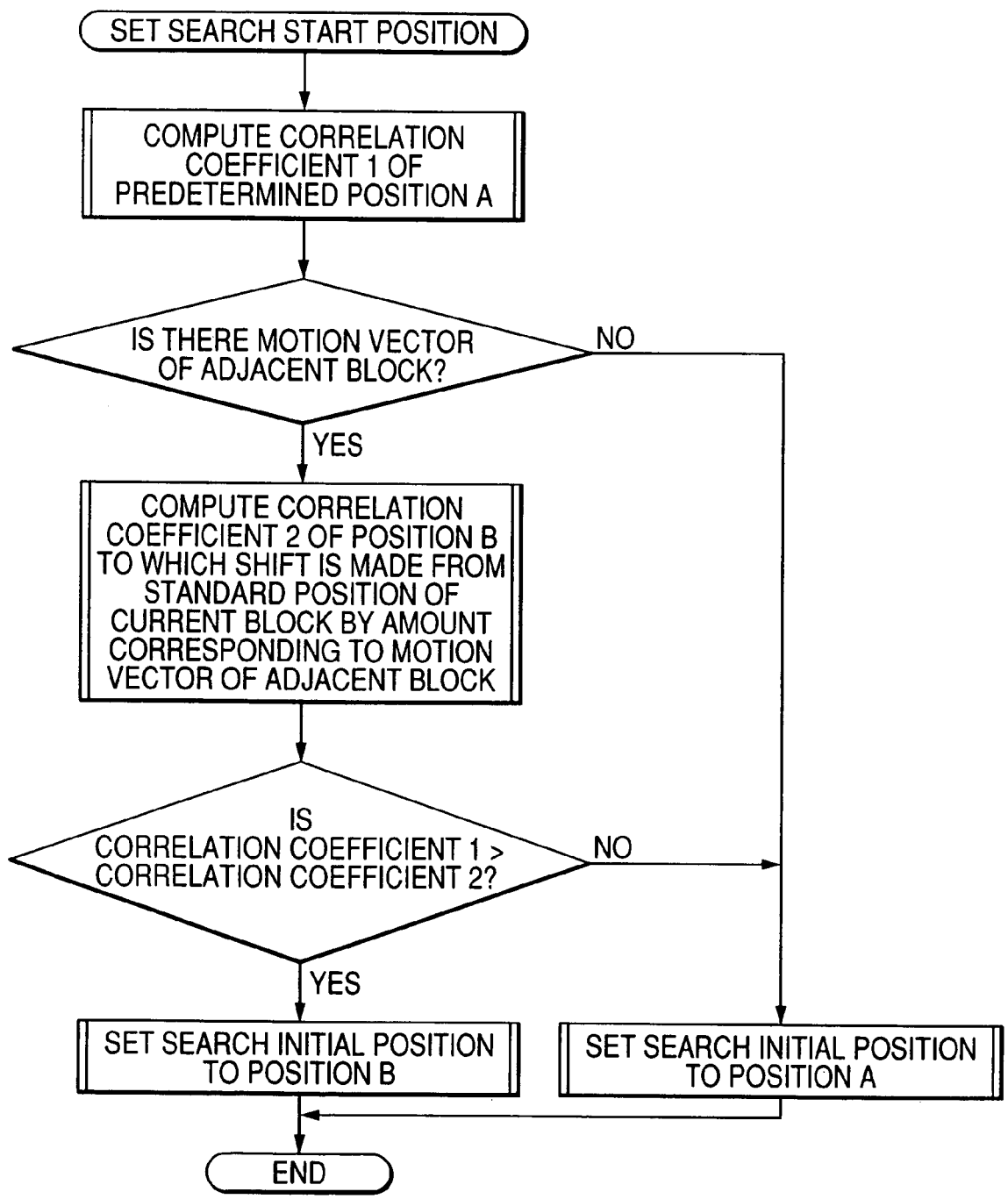
FIG. 18 is a flowchart showing procedures for determining a search start position when a motion vector of an adjacent standard block can be used.

FIG. 18 is a flowchart showing procedures for determining whether or not a search start position is adopted when a motion vector of an adjacent standard block can be used. In FIG. 17, the search position setting standards are switched according to the result of determination.

Fifth Embodiment

Correlation computation requires a lot of computing operations. For instance, when the standard block of 16×16 pixels is subjected to correlation computation, 256 subtractions and 256 additions are required. For this reason, the sub-sampling operation, such as use of only even-numbered pixels in the standard blocks, as shown in FIGS. 4 and 13, is commonly performed.

At this time, the position where the sub-sampling is performed changes according to the search positions. This will be described by reference to FIG. 13. FIG. 13A shows the manner in which the standard block of 16×16 pixels is sub-sampled. Pixels used in the drawing are denoted in gray.

FIGS. 13B, 13C, and 13D show reference blocks of the search standard positions. Here, reference blocks of the search positions "l", T, and "t" shown in FIG. 13E are denoted by a thick frame in FIGS. 13B, 13C, and 13D. As can be seen from a comparison between FIGS. 13B and 13C, when the search position is offset by one pixel, sub-sampling positions of the reference blocks are changed. Although another search position is not illustrated, the position is realized by downwardly offsetting the reference blocks indicated by the thick frame by one line.

When sub-sampling is performed, pipeline processing of 1, 3, 4, 6, 7, and 9 lines shown in FIG. 5 (other than the search positions T, C, and B) and that of 2, 5, and 8 lines (the search positions T, C, and B) cannot be performed simultaneously. Alternatively, independent pipeline processing for the lines 1, 3, 4, 6, 7, and 9 and independent pipeline processing for the lines 2, 5, and 8 must be prepared.

In the present embodiment, two channels of image data formed by sub-sampling the reference image are prepared. The image memory of the reference block separated for correlation computation of search positions other than the search positions T, C, and B and correlation computation of the search positions T, C, and B is used, thereby enabling pipeline processing.

Although not illustrated, the number of pieces of image memory of the sampled reference block is similarly increased even when sub-sampling is performed every two pixels or every three pixels rather than every pixel. For instance, sub-sampling is performed every two pixels, the search positions "t", L, and "b" are assigned to the reference image memory 1; the search positions T, C, and B are assigned to the reference image memory 2; and other search positions are assigned to the reference image memory 3, whereby similar effects can be yielded.

Figure 7:
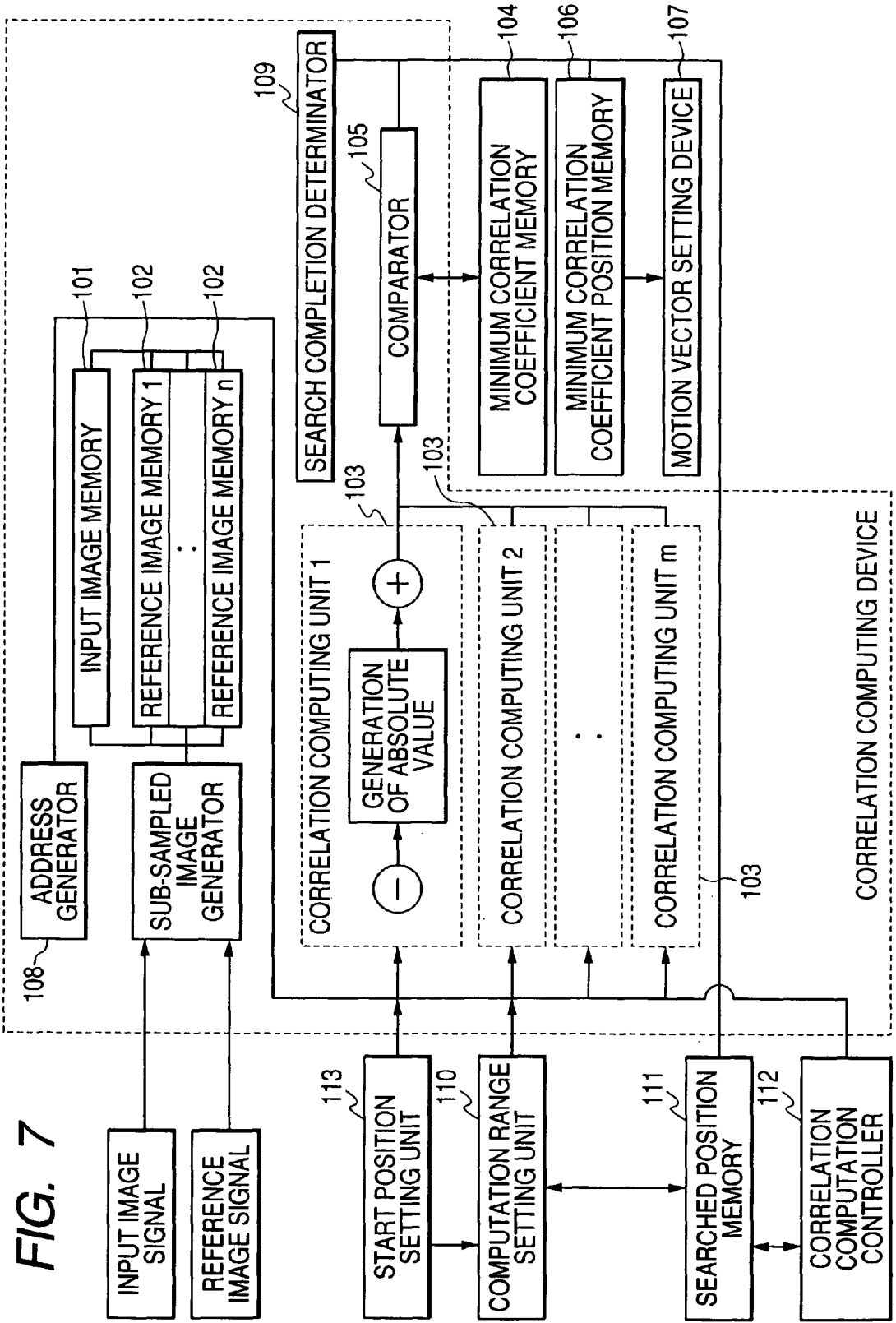
FIG. 7 is a block diagram showing the configuration of a motion vector sensor according to a fifth embodiment of the present invention.

FIG. 7 is a block diagram showing the configuration of a motion vector sensor according to a fifth embodiment of the present invention. In FIG. 7, the number of pieces of the reference image memory 102 is increased to "n" in accordance with the sub-sampling method in connection with the configuration of the first embodiment shown in FIG. 6.

The reference image memory 102 does not need to be physically divided, and the only requirement is that the reference image memory can make simultaneous access. For instance, a higher-level of a single address is assigned to the reference image memory 1, and a lower level of the single address may be assigned to the reference image memory 2 (or the single address may be further divided into a plurality of levels).

Figure 12:
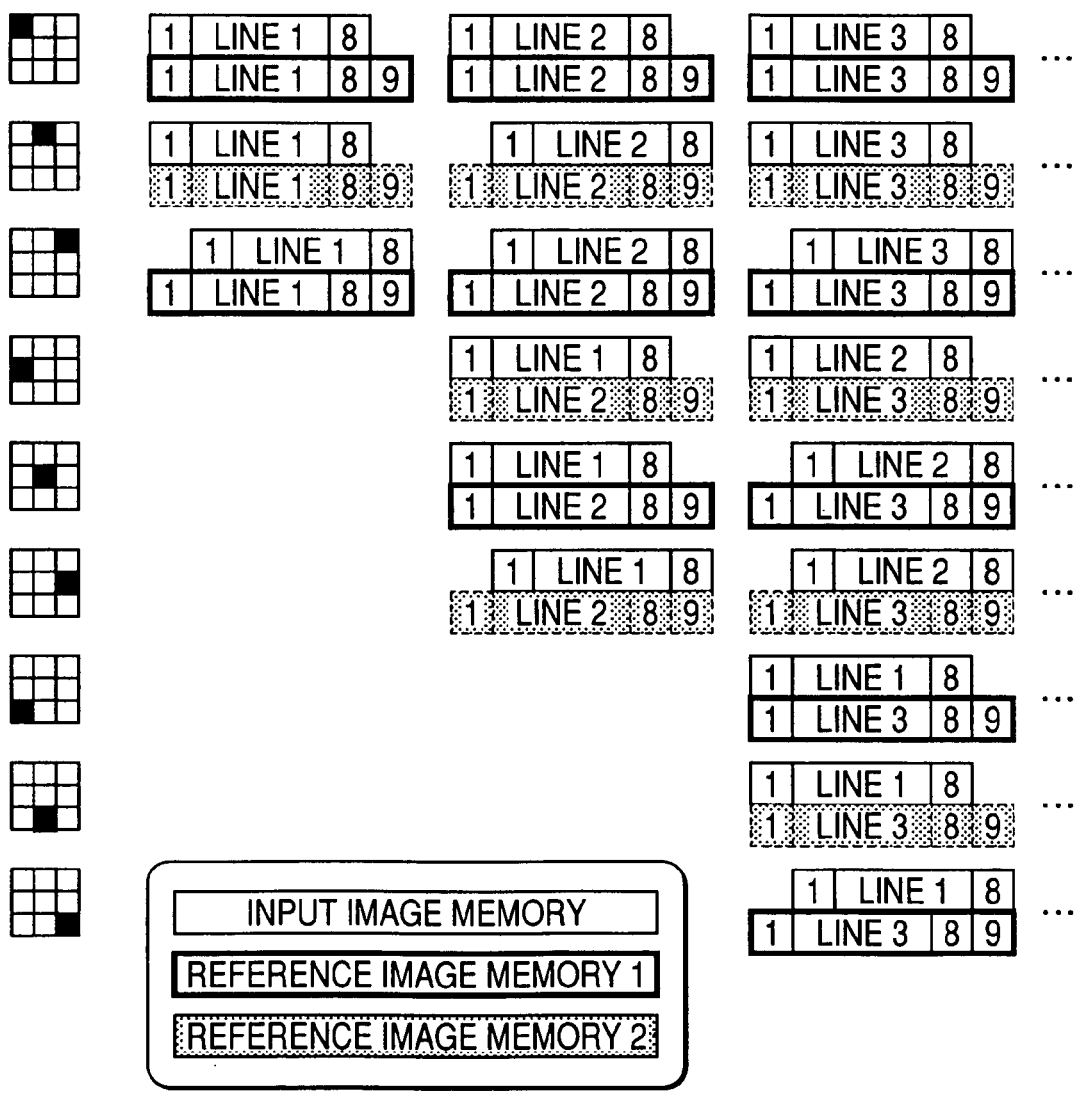
FIG. 12 is a view showing a timing of pipeline processing of a correlation computing unit of a motion vector sensor according to a fifth embodiment of the present invention.

FIG. 12 is a view showing a timing at which the correlation computing units 1 to 9 compute correlation coefficients when sub-sampling is performed every pixel, in the same manner as in FIG. 5. The basic operation of the correlation computing units is identical with that of the correlation computing units shown in FIG. 5. However, the reference image memories assigned to the correlation computing units are different.

As mentioned above, in the present embodiment, a plurality of pieces of the reference image memory are used in accordance with the sub-sampling method. Hence, deterioration of the efficiency of pipeline due to sub-sampling is avoided, and the time required to search a motion vector can be curtailed, or the search range of a motion vector within a predetermined time can be enlarged. Thus, search of a motion vector of a quick-moving subject becomes possible.

The motion vector detecting apparatus and the method for detecting the motion vector according to the present invention enable speedup of search of an extreme value when compared with that performed under a related one-at-a-time method. A correlation extreme value is searched while the center position is moved on the basis of predetermined search position setting standards. Hence, search of the extreme value can be performed efficiently. There is yielded an effect of the ability to search a correlation extreme value after one movement of the center position of the search range or, at worst, two movements of the center position. The device and method are useful as a motion vector detection technique or the like to be employed by a moving picture compression encoding device.

What is claimed is:

1. A motion vector sensor which detects a motion vector by a block matching method for computing a correlation between a standard block of interest of a standard image and an image block of a reference image, the sensor comprising:
a plurality of correlation computing units which perform parallel processing of search positions within a search range defined while taking as a center position an image block located in the same position on the reference image as that of the standard block by a pipeline method;
search means which searches a correlation extreme value while sequentially moving the center position on the basis of a predetermined search position setting standard in accordance with a result of correlation computation,
correlation coefficient memory for sequentially storing a correlation minimum value exhibiting the maximum correlation;
comparator which detects a correlation minimum value exhibiting the maximum correlation and a search position in accordance with a progress in correlation computation;
computation range setting unit which determines the next search range in accordance with the search position exhibiting the maximum correlation; and
search completion determinator which determines whether or not the correlation minimum value of the maximum correlation position has reached a correlation extreme value.

2. The motion vector sensor according to claim 1, further comprising sub-sampled image generator which generates image data for a plurality of channels by sub-sampling the standard image and the reference image in accordance with the search position.

3. The motion vector sensor according to claim 1, wherein the predetermined search position setting standard determines the search range so as to enable determination of a correlation extreme value after having moved the center position once or to enable determination of a correlation extreme value after having moved the center position twice.

4. The motion vector sensor according to claim 3, wherein, when the search range is expressed by a rectangular shape on the reference image and when a current position of the minimum correlation value is situated in the center of a side of the rectangular, the predetermined search position setting standard sets the search range such that the position comes to a center of a side of a next search range and such that a maximum number of unsearched search positions are included; and, when the current position of the minimum value is situated at a corner of the rectangular shape, the predetermined search position setting standard sets the search range such that the position comes to a center of a next search range.

5. The motion vector sensor according to claim 3, wherein, when the search range is expressed by a rectangular shape on the reference image and when a current position of the minimum correlation value is situated in the center of a side of the rectangular, the predetermined search position setting standard sets the search range such that the position comes to a center of a side of a next search range and such that a maximum number of unsearched search positions are included; and, when the current position of the minimum value is situated at a corner of the rectangular shape, the predetermined search position setting standard sets the search range which includes the position and has been moved so as to include the maximum number of unsearched search positions.

6. The motion vector sensor according to claim 4, wherein, when the current position of minimum correlation position is situated at a corner of the rectangular and when a position of the minimum correlation value achieved after setting the search range including the position and having been moved so as to include the maximum number of unsearched search positions is the same position, the predetermined search position setting standard sets a search range centered on the position of the minimum correlation value.

7. The motion vector sensor according to claim 3, wherein, when the number of correlation computation operations has exceeded a predetermined number, a new search range is set by replacing the search position setting standard.

8. The motion vector sensor according to claim 3, wherein, when the number of correlation computation operations has fallen short of a predetermined number, a new search range is set by replacing the search position setting standard.

9. The motion vector sensor according to claim 3, wherein, when a result of detection of a motion vector of a standard block adjacent to a current standard block is usable, the search position setting standard is selected according to an evaluation of whether or not a motion vector of the adjacent standard block is used, thereby setting a search range.

10. The motion vector sensor according to claim 1, wherein control is performed such that correlation computation of searched search positions is inhibited.

* * * * *